Oct. 22, 1940.  S. A. SCHERBATSKOY  2,219,274
WELL SURVEY METHOD AND APPARATUS
Filed Oct. 16, 1939
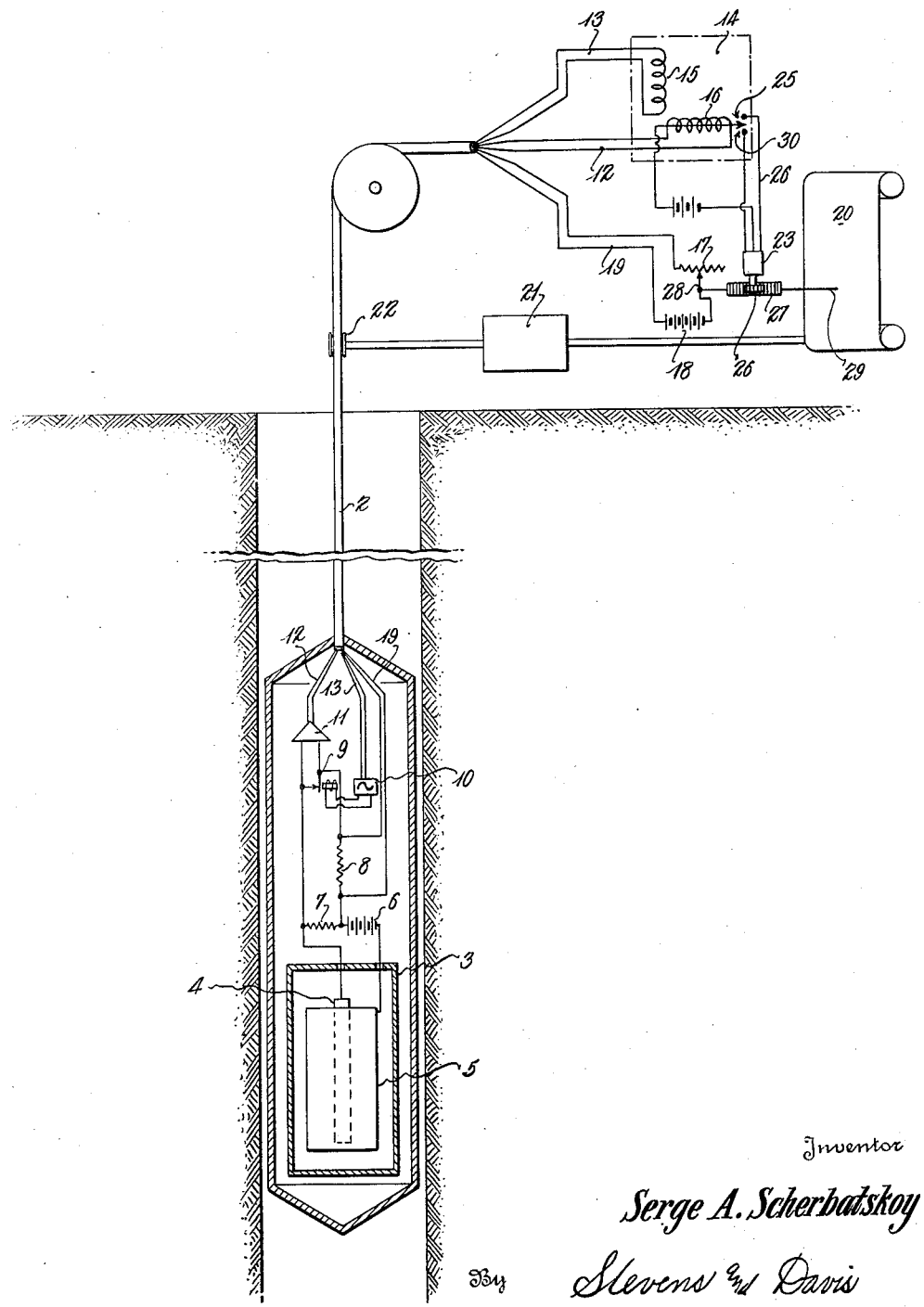
Inventor
Serge A. Scherbatskoy
By Stevens and Davis
Attorneys Patented Oct. 22, 1940

2,219,274

UNITED STATES PATENT OFFICE 2,219,274

WELL SURVEY METHOD AND APPARATUS

Serge Alexander Scherbatskoy, Tulsa, Okla., assignor to Well Surveys, Incorporated, Tulsa, Okla., a corporation of Delaware Application October 16, 1939, Serial No. 299,767

11 Claims. (Cl. 250—83)

This invention relates to a method and apparatus for geophysical exploration and particularly to a method and apparatus for measuring the relative intensities of radiations from radioactive materials or the like, emanating or reflected from subsurface formations and hereinafter referred to as "radioactive radiations" or merely as "radiations."

It is well known that radioactive substances are present in small proportions in the earth's crust and that the proportions are different in different subsurface formations or strata. By measuring the intensity of the radiations emanating from these substances and penetrating a drill hole at various depths, an indication of the type of formations lying adjacent the drill hole at the various depths may be obtained. It is also known that the subsurface formations reflect, or generate secondary radiations in response to exposure to, radiations of the type generated by radioactive materials, X-ray tubes and the like and that a measurement of these reflected radiations may be used to determine the nature of and the interfaces between the various strata.

Devices have heretofore been described which are lowered into a well or other opening in the earth to detect and measure the intensities of any of these types of radiations encountered therein. Such devices usually comprise a housing which is suspended in a drill hole by a cable which is also used to make electrical connections between the surface and the elements in the housing. In the housing there is preferably a high pressure ionization chamber containing an inert gas such as nitrogen under a pressure of around 300 lbs. per square inch and means for impressing a voltage across it sufficient to cause a continuous current to flow between its electrodes. The magnitude of the current depends upon applied voltage which is substantially constant and the intensity of the radiations which varies according to the nature of the surrounding strata.

Since the continuous current flowing in the ionization chamber circuit is extremely small it is impracticable to convey this current directly to the surface of the ground and record it. Prior to this invention attempts were made to directly amplify the current and send it to the surface for recording, but great difficulty was encountered because the very sensitive amplifiers necessary are not sufficiently stable under field conditions and are subject to "drifts" and "direct current microphonics" which introduce relatively large errors into the output current.

Another system has been suggested according to which a voltage caused by the direct current from the ionization chamber is interrupted to provide a pulsating voltage which is applied to an alternating current amplifier and the output sent to the surface to be recorded by an alternating current recorder. This system is described in detail in applicant's copending application Serial Number 279,577, filed June 16, 1939.

Among the types of interrupter circuits that may be used to convert the direct current voltage to a pulsating voltage is the so-called mechanical commutator circuit which is described in applicant's copending application above mentioned and a capacitative commutator circuit described in a copending application of Robert E. Fearon filed concurrently herewith and bearing Serial Number 299,766.

These alternating current systems possess a decided advantage over the direct current systems but still leave much to be desired in the accuracy of the recordings. "Drifts" and "direct current microphonics" are avoided, yet any shock or jar to the device causes a deformation in the elements of the electron tubes in the amplifier and a corresponding instantaneous variation or inaccuracy in the recording although the variation is not permanent as it is likely to be in a direct current amplifier. Therefore, very delicate handling is still necessary and the usefulness of the system is obviously limited.

The present invention provides for a method and apparatus for still more accurately measuring the intensities of radiations impinging on an ionization chamber by avoiding the aforementioned disadvantages and may be adapted for use either with systems for measuring natural radioactivity or with systems for measuring induced or reflected radioactivity.

In brief this invention involves measuring the output currents of an ionization chamber by what may be termed the "null" method. This method consists in balancing the voltage drop across a resistor in series with the ionization chamber by another voltage drop across another resistor supplied with current from the surface of the ground and maintaining the two voltage drops in balance by sending to the surface a current generally proportional to any difference between the voltage drops, which current serves to adjust the current sent down the additional resistor so as to restore balance between the voltage drops.

The current to be amplified is thus continuously maintained near zero and the exact degree of its amplification is not an important factor since it only affects the sensitivity of the device to a slight extent and does not directly introduce errors into the record if it changes. For example, if in the system of applicant's previous application or in a direct current system, we assume in an exaggerated case, that the casing strikes something in the well which displaces the tube elements and doubles the amplification of the amplifier, the record will indicate twice the intensity of radiations while the elements are displaced. As contrasted to this, if the same thing occurs with the present system, larger currents are sent to the surface when it becomes unbalanced but these only tend to more quickly restore the balance and hence the system is only made more sensitive and no error is introduced into the record.

Consideration of the drawing and the following detailed description thereof will yield a more thorough understanding of the general principles of this invention as well as of the preferred embodiment shown therein.

In the drawing the sole figure is a diagrammatic illustration of a preferred form of device constructed according to this invention.

As illustrated by the drawing, the process of this invention may be performed with a device which consists of a main housing 1 suspended on the lower end of a cable 2 which serves both to support the housing and to furnish an electrical connection between the elements in the housing and the surface apparatus. Within the casing 1 is an hermetically sealed ionization chamber 3 containing a pair of spaced electrodes 4 and 5 in an atmosphere of nitrogen under a pressure around 300 lbs. per square inch. The inner electrode 4 as shown in the drawing is in the shape of a vertical rod and the outer electrode 5 has the shape of a cylindrical tube with a radius of about 2 inches. Both electrodes are preferably of iron, though other metals may be used. Other gases and other pressures may also be used.

Connected across the electrodes of the ionization chamber is the battery 6 having a potential of around 150 volts. The negative side of the battery is connected to the outer electrode and the positive side is connected through a resistor 7 to the inner electrode. The resistor 7 preferably has a relatively high resistance, for example of around $10^{12}$ ohms. Connected in series with the resistor 7 is another resistor 8 which is used as the balancing resistor.

Across the two series connected resistors 7 and 8 is a magnetically operated contacting device or commutator 9. This device is driven by a source of alternating current 10 which may be an oscillator or any other combination of electrical elements that will generate the necessary alternating current. The commutator is preferably operated at a frequency of about 100 cycles. The preferred form of the commutator is a vibrating reed with a tungsten contact face and a stationary contact element which touches the vibrating element during part of the cycle. During the periods of contact between the vibrating element and the stationary element the voltage across the contacts is obviously zero. During the periods when the contacts are open the voltage thereacross will be the difference between the voltage drops across the resistors 7 and 8.

The input terminals of an amplifier 11 are connected directly across the contacts of the commutator. When the voltage drop across the resistor 7 is equal to the voltage drop across the resistor 8, no current passes through the commutator 9 at any time and consequently there is no input into the amplifier 11. If, however, the voltage across one of the resistors 7 or 8 increases or decreases with respect to the other, there will appear a corresponding pulsating voltage across the input of the amplifier 11, the phase of which with respect to the current driving the contacts 9 of the commutator depends upon the direction of the developed voltage which in turn depends upon which resistor is developing the greatest voltage drop. An alternating current proportional to the impressed pulsating voltage upon the amplifier 11 is taken from said amplifier and transmitted by means of a circuit 12 and through cable 2 to a recorder controller on the surface. This recorder controller automatically and continuously balances the voltage drops in the two resistors 7 and 8 by varying the current through resistor 8 until the output of the amplifier is zero and records the variations in current necessary to accomplish this result.

In order to control properly the current to the resistor 8 it is necessary to provide an indication showing not only the magnitude of the unbalance between the voltages developed across the resistors 7 and 8, but also the polarity of the unbalance. Since the polarity determines the phase of the pulsating input to the amplifier 11 and hence the phase of its output, a recorder controller may accordingly be provided with a galvanometer which is responsive to the phase as well as the magnitude of the received currents. Such a galvanometer is shown in the drawing at 14 and consists of a fixed coil 15 and a moving coil 16. The fixed coil 15 is connected by a circuit 13, to the source of alternating current that drives the commutator 9 and the moving coil 16 is connected by a circuit 12 to the output terminals of the amplifier 11. The coils are so placed that if the currents bear the phase relation to each other that they will bear if the voltage drop is in one direction, then the moving coil will move in one direction, whereas if the voltage drop is in the other direction, a change in phase will result and any movement will be in the opposite direction.

In the particular embodiment shown a larger voltage drop across resistor 8, will cause the moving coil 16 to move so as to close a circuit comprising a battery 24, contacts 25, and a servomotor 23, which when so actuated revolves a pinion 26 against a rack 27 which rack carries a sliding arm 28 for a variable resistor 17 and also carries a pen 29 of a recorder 20. The recorder paper is moved by the movement of the cable 2 up or down in the well through a mechanical drive 21 operated by a pulley 22 engaging with the cable 2, or an electrical servomotor drive, such as a "Selsyn" system. The variable resistance 17 is connected in series with a battery 18 and through circuit 19, also in series with the balancing resistor 8. As the motor 23 operates the variable resistance 17 is changed to change the current through the balancing resistor until it is returned to balance. If the change is in the other direction, that is if the voltage drop across the balancing resistor 8 becomes smaller than that across the main resistor 7, then the phase relation between the commutator driving voltage and the amplifier voltage is reversed and the moving coil of the galvanometer moves in the opposite direction closing contacts 30 which send the current from the servomotor driving battery 24 through the servomotor 23 in the opposite direction and hence effect a correction and recording in the opposite direction.

The preferred type of recorder controller is a

"Micromax" recorder which is manufactured by the Leeds and Northrup Company of Philadelphia, Pennsylvania. The details of this recorder are shown in U. S. Patents Nos. 1,578,279; 1,934,882; and 1,935,732.

Claim:

1. In a method of geophysical exploration that comprises lowering an ionization chamber into a drill hole or the like and measuring the rate of current flow therethrough at various levels as an indication of the intensity of the radioactive radiations encountered at those levels, the method of measuring the rate of flow of the current through the ionization chamber that comprises electrically matching said current flow with an external current flow, transmitting an indication of any difference between said current to a recording point, adjusting said external current flow at said recording point so that it will exactly balance the current flow through the ionization chamber by reference to the transmitted indication of difference and recording the magnitude of the external current flow as a measure of the intensity of the radiations impinging upon the ionization chamber.

2. In a method of geophysical exploration that comprises lowering an ionization chamber into a drill hole or the like and measuring the rate of current flow therethrough at various levels as an indication of the intensity of the radioactive radiations encountered at those levels, the method of measuring the rate of flow of the current through the ionization chamber that comprises matching a voltage proportional to said current flow with a voltage proportional to an external current flow, transmitting an indication of any difference between said voltages to a recording point, adjusting said external current flow at said recording point so that the voltage proportional to it will balance the voltage proportional to the current flow through the ionization chamber by reference to the transmitted indication of difference and recording the magnitude of the external current flow as a measure of the intensity of the radiations impinging upon the ionization chamber.

3. In a method of geophysical exploration that comprises lowering an ionization chamber into a drill hole or the like and measuring the rate of current flow therethrough at various levels as an indication of the intensity of the radioactive radiations encountered at those levels, the method of measuring the rate of flow of the current through the ionization chamber that comprises matching a voltage proportional to said current flow with a voltage proportional to an external current flow, transmitting an indication of any difference between said voltages to a recording point by converting said difference in voltages into a pulsating voltage, amplifying said pulsating voltage and conducting it to said recording point, adjusting said external current flow at said recording point so that the voltage proportional to it will balance the voltage proportional to the current flow through the ionization chamber by reference to the transmitted indication of difference and recording the magnitude of the external current flow as a measure of the intensity of the radiations impinging upon the ionization chamber.

4. In a device for geophysical exploration that comprises an ionization chamber adapted to be lowered into a drill hole or the like and in which the rate of current flow therethrough at various levels is an indication of the intensity of the radioactive radiations encountered at those levels, means for measuring the rate of flow of current through said ionization chamber that comprises a resistance in series with said ionization chamber and its source of potential, a second resistor in series with an external source of potential and electrically connected at one end to one end of said first mentioned resistor, means for transmitting any potential difference existing between the opposite ends of the pair of resistors so connected to the surface, means for changing the rate of current flow through said second resistor, means operated by said transmitted difference in potential for controlling the means to vary the current in the second resistor in such a manner as to bring the potential difference substantially to zero, and means also operated by said controlling means for recording the amount of current necessary to bring the difference in potential to zero.

5. In a device for geophysical exploration that comprises an ionization chamber adapted to be lowered into a drill hole or the like and in which the rate of current flow therethrough at various levels is an indication of the intensity of the radioactive radiations encountered at those levels, means for measuring the rate of flow of current through said ionization chamber that comprises a resistance in series with said ionization chamber and its source of potential, a second resistor in series with an external source of potential and electrically connected at one end to one end of said first mentioned resistor, means for transmitting any potential difference existing between the opposite ends of the pair of resistors so connected to the surface, means for changing the rate of current flow through said second resistor, means operated by said transmitted difference in potential for controlling the means to vary the current in the second resistor in such a manner as to bring the potential difference to zero, means also operated by said controlling means for recording the amount of current necessary to bring the difference in potential substantially to zero, and means for recording the depth at which the ionization chamber is operating in correlation with the recording of current.

6. In a device for geophysical exploration that comprises an ionization chamber adapted to be lowered into a drill hole or the like and in which the rate of current flow therethrough at various levels is an indication of the intensity of the radioactive radiations encountered at those levels, means for measuring the rate of flow of current through said ionization chamber that comprises a resistance in series with said ionization chamber and its source of potential, a second resistor in series with an external source of potential and electrically connected at one end to one end of said first mentioned resistor, means for commutating any potential difference existing between the opposite ends of the pair of resistors so connected, to convert it into a pulsating voltage, means to amplify said pulsating voltage and means to conduct it to the surface, means for changing the rate of current flow through said second resistor, means operated by said transmitted difference in potential for controlling the means to vary the current in the second resistor in such a manner as to bring the potential difference to zero, and means also operated by said controlling means for recording the amount of current necessary to bring the difference in potential to zero.

7. In a device for geophysical exploration that comprises an ionization chamber adapted to be lowered into a drill hole or the like and in which the rate of current flow therethrough at various levels is an indication of the intensity of the radioactive radiations encountered at those levels, means for measuring the rate of flow of current through said ionization chamber that comprises a resistance in series with said ionization chamber and its source of potential, a second resistor in series with an external source of potential and electrically connected at one end to one end of said first mentioned resistor, means for commutating any potential difference existing between the opposite ends of the pair of resistors so connected to convert it into a pulsating voltage, a source of alternating current connected to drive said commutating means synchronously, means to amplify said pulsating voltage and means to conduct it to the surface, means for changing the rate of current flow through said second resistor, means operated by said transmitted difference in potential and alternating current from the aforementioned source for controlling the means to vary the current in the second resistor in such a manner as to bring the potential difference to zero, means also operated by said controlling means for recording the amount of current necessary to bring the difference in potential to zero and means for recording the depth at which the ionization chamber is operating in correlation with the record of current.

8. In a device for geophysical exploration that comprises an ionization chamber adapted to be continuously lowered into and raised from a drill hole or the like and in which the rate of current flow therethrough at various levels is a continuous indication of the intensity of the radioactive radiations encountered at those levels, means for continuously measuring the rate of flow of current through said ionization chamber that comprises a resistance in series with said ionization chamber and its source of potential, a second resistor in series with an external source of potential and electrically connected at one end to one end of said first mentioned resistor, means for continuously commutating any potential difference existing between the opposite ends of the pair of resistors so connected, to convert it into a pulsating voltage, a source of alternating current connected to drive said commutating means synchronously, means to amplify said pulsating voltage and means to conduct it to the surface, means for changing the rate of current flow through said second resistor, means continuously operated by said transmitted difference in potential and alternating current from the aforementioned source for continuously controlling the means to vary the current in the second resistor in such a manner as to continuously bring the potential difference to zero, means also operated by said controlling means for continuously recording the amount of current necessary to bring the difference in potential to zero and means for continuously recording the depth at which the ionization chamber is operating in correlation with the record of current.

9. In a method of geophysical exploration that includes moving a measuring instrument within a well bore, forming an electrical current at said instrument having a magnitude related to measurements made by said instrument, the improvements that comprise measuring the rate of flow of said current by matching a voltage proportional to said current with a voltage proportional to an external current flow, transmitting a signal current related to any difference between said voltages from the instrument, altering the external current flow in response to said signal current whereby the said voltages will be substantially exactly matched, and recording variations of the external current flow as indications of measurements made by said instrument.

10. In a method of geophysical exploration that includes moving a radiation-sensitive measuring instrument in the vicinity being explored, forming an electrical current at said instrument having a magnitude related to the radiation measurements made by said instrument, the improvements that comprise measuring the rate of flow of said current by matching a voltage proportional to said current with a voltage proportional to an external current flow, transmitting a signal current related to any difference between said voltages from the instrument, altering the external current flow in response to said signal current whereby the said voltages will be substantially exactly matched, and recording variations of the external current flow as indications of measurements made by said instrument.

11. In a geological exploration device, a radiation-sensitive instrument producing an electrical current having a varying magnitude related to changes in character of geological formations in the vicinity of the device, the improvements that comprise means for measuring the rate of flow of said current including means for forming a voltage proportional to said current, means for forming a voltage proportional to an external current flow, means for matching said voltages and forming a signal current related to any difference between said voltages, means for altering the external current flow in response to said signal current whereby the said voltages will be substantially exactly matched, and means for recording variations of the external current flow as indications of measurements made by said instrument.

SERGE ALEXANDER SCHERBATSKOY.